(12) United States Patent
Torkuhl et al.

(10) Patent No.: US 11,883,811 B2
(45) Date of Patent: Jan. 30, 2024

(54) CATALYST MATERIAL AND METHOD OF MANUFACTURING THE SAME

(71) Applicants: Alantum Europe GmbH, Munich (DE); Fraunhofer-Gesellschaft zur Förderung der angewandten Forschung e.V., Munich (DE)

(72) Inventors: Lars Torkuhl, Munich (DE); Robin Kolvenbach, Munich (DE); JungSuk Bae, Seoul (KR); Andreas Tillmann, Unterhaching (DE); Alexandra Gerstle, Munich (DE); Gunnar Walther, Dresden (DE); Tilo Büttner, Dresden (DE); Hans-Dietrich Böhm, Dresden (DE); Bernd Kieback, Possendorf (DE); Thomas Weissgärber, Dresden (DE); Arne Boden, Dresden (DE)

(73) Assignees: ALANTUM EUROPE GMBH, Munich (DE); FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 205 days.

(21) Appl. No.: 17/261,362

(22) PCT Filed: Jul. 16, 2019

(86) PCT No.: PCT/EP2019/069133
§ 371 (c)(1),
(2) Date: Jan. 19, 2021

(87) PCT Pub. No.: WO2020/016234
PCT Pub. Date: Jan. 23, 2020

(65) Prior Publication Data
US 2021/0316291 A1  Oct. 14, 2021

(30) Foreign Application Priority Data
Jul. 20, 2018 (EP) .................................... 18184662

(51) Int. Cl.
*B01J 35/04* (2006.01)
*B01J 23/745* (2006.01)
*B01J 23/755* (2006.01)
*B01J 23/26* (2006.01)
*B01J 37/02* (2006.01)
*B01J 37/08* (2006.01)
*B01J 21/00* (2006.01)
*B01J 37/34* (2006.01)

(52) U.S. Cl.
CPC ............ *B01J 35/04* (2013.01); *B01J 21/005* (2013.01); *B01J 23/26* (2013.01); *B01J 23/745* (2013.01); *B01J 23/755* (2013.01); *B01J 37/0217* (2013.01); *B01J 37/0221* (2013.01); *B01J 37/0225* (2013.01); *B01J 37/08* (2013.01); *B01J 37/344* (2013.01)

(58) Field of Classification Search
CPC . B01J 35/04; B01J 21/005; B01J 23/26; B01J 23/755; B01J 37/0217; B01J 37/0221; B01J 37/0225; B01J 37/08; B01J 37/344
See application file for complete search history.

(56) References Cited

U.S. PATENT DOCUMENTS

| 7,166,323 | B2* | 1/2007 | Chung | ............. C23C 8/02 427/383.1 |
| 9,346,240 | B2* | 5/2016 | Walther | ............. C22C 33/0285 |
| 2004/0086637 | A1 | 5/2004 | Chung | |
| 2014/0004259 | A1* | 1/2014 | Walther | ............. C22C 33/0285 427/180 |

FOREIGN PATENT DOCUMENTS

| CN | 102409237 A | 4/2012 |
| DE | 102007012585 A1 | 12/2008 |
| EP | 2315738 A2 | 5/2011 |
| EP | 2537581 A1 | 12/2012 |
| KR | 20180018999 A | 2/2018 |
| WO | 2016156789 A1 | 10/2016 |
| WO | 2018078069 A1 | 5/2018 |

OTHER PUBLICATIONS

International Search Report dated Sep. 20, 2019 for International Application No. PCT/EP2019/069133, three (3) pages.
Canadian Intellectual Property Office, Office Action issued in Appl. No. 3,106,412, dated Feb. 6, 2023, 4 pgs.

* cited by examiner

*Primary Examiner* — Yong L Chu
(74) *Attorney, Agent, or Firm* — Greenberg Traurig, LLP

(57) ABSTRACT

A method of manufacturing a catalyst material includes the steps of: providing a body having an open-porous foam structure and comprising at least a first metal or alloy; providing particles, each of which particles comprising at least a second metal or alloy; distributing the particles on the body; forming a structural connection between each of at least a subset of the particles and the body; and forming an oxide film on at least the subset of the particles and the body, wherein the oxide film has a catalytically active surface.

13 Claims, No Drawings

CATALYST MATERIAL AND METHOD OF MANUFACTURING THE SAME

TECHNICAL FIELD

The present invention relates to a catalyst material and a method for manufacturing a catalyst material.

BACKGROUND

The implementation of catalytic reactions on industrial scales poses stringent requirements on catalyst materials.

Structure sensitive reactions such as the hydrogenation of conjugated double bonds or aromatic compounds require specific surface structures and large surface areas to obtain high catalytic activities. On the other hand, structure insensitive reactions such as the hydrogenation of non-conjugated double-bonds show an optimum at predetermined surface area dimensions and decreasing activities with further expansion of the catalyst's surface.

Metal foam substrates show advantageous characteristics in regards of heat and mass transfer due to their open-porous structure and high thermal conductivity. Metallic substrates are broadly used as catalyst supports, but they are difficult to integrate with metal oxidic coatings. Poor adhesion of coatings, corrosion of the metal surface and side reactions catalysed by the underlying metal substrate represent common problems within this field. When placed into a reactor and subjected to high temperatures or thermal cycling, the thermal expansion mismatch between metal substrate and coatings may lead to delamination, loss of catalyst (attrition), side-reactions catalysed by exposed, bare metal surfaces and increase of pressure drop due to abraded dust blogging pores. Aggressive reaction conditions accelerate oxidation and corrosion, especially of bare metal surfaces of the structured support, reducing their lifespan. The interfacial layer between metal substrate surface and catalyst coating hence is a key factor for retaining long catalyst lifetime, high selectivity and profitable catalytic activity.

Metal foams are a particular form of catalyst material, which is used in various industrial fields and can be of either an open cell type or a closed cell type. A metal foam of the open cell type has pores which are connected to each other, whereas in the closed cell type the pores are not connected to each other. Accordingly, a fluid can pass through the former, but not the latter, making open-porous metal foams interesting candidates as catalyst materials due to their low weight but high surface area ratio per unit volume.

As a starting material, reticulated metallic foams are used which can be obtained by a variety of methods. For example, an organic polymer (e.g., polyurethane) foam can be coated (e.g. by spraying or otherwise depositing) with a first metallic material. Subsequently, the organic polymer foam is removed, e.g., by burning it off at an elevated temperature or by removing it with a suitable solvent leaving behind a metallic foam structure.

While known catalyst materials based on metallic foams cover a range of applications, it is, however, desirable to further extend the applicability of such catalyst materials and be able to adapt the catalyst material more precisely to particular applications.

SUMMARY

According to a first aspect of the present invention, a method of manufacturing a catalyst material comprises the steps of providing a body having an open-porous foam structure and comprising at least a first metal or alloy; providing particles, each of which particles comprising at least a second metal or alloy; distributing the particles on the body; forming a structural connection, in particular including the formation of mixed metallic and intermetallic phases as well as chemical bondings (including metal-metal and metal-non metal bondings), between each of at least a subset of the particles and the body; and forming an oxide film on at least the subset of the particles and preferably also the body, wherein the oxide film has a catalytically active surface.

Using oxide films having a catalytically active surface on a metallic foam body provides for additional control over the resulting surface properties of the catalyst material by being able to control the chemical composition of the metal oxide(s) and its density properties including the formation of density gradients leading to improved adjustability of the surface roughness, the final porosity as well as the active surface area of the catalyst material. Surface properties of the catalyst material represent important regulation variables for mass transport properties, the residence time of reactants and the accessibility of catalytically active sites. They can be controlled at microscopic (<1 nm), mesoscopic (1 nm-200 µm) and macroscopic levels (>200 µm). The macroscopic level refers to the nature, size and distribution of pores, channels as well as the surface of the base foam structure. The mesoscopic surface, porosity and density is generated by open spaces in between the three-dimensional arrangement of particles on the foam surface. The microscopic level refers to micro- and submicropores within the final oxidic surface layer. Density gradients may be realised in a variety of ways. For instance, the body may be covered in different particles (wherein 'different' may relate to properties such as the chemical composition or size). In addition or alternatively, the particles may be distributed inhomogeneously on the body. Moreover, only selected parts of the surface may be oxidised. As another example, the oxygen partial pressure during formation of the film may be varied.

The step of forming the catalytically-active oxide film may comprise forming at least one metal oxide capable of changing its oxidation state and being suitable for catalysing hydrogenation reactions at elevated temperatures, preferably above 100° C. and more preferably between 200° C. and 400° C. Suitable metal oxides for catalysing hydrogenation reactions are oxides of Fe, Co, Ni, Ti, V, Cr, Mo and/or W, wherein the term metal oxide may refer to a metal oxide comprising a single metallic element M or a mixed metal oxide comprising more than one metallic element.

The step of forming the catalytically-active oxide film may comprise forming at least one metal oxide having weakly bonded lattice oxygen atoms wherein said metal oxide is suitable for catalysing, e.g., the partial oxidation of organic compounds. An active $MnO_2$ surface may for example also serve to catalytically decompose peroxides like hydrogen peroxide. Examples of suitable (mixed) metal oxides for partial oxidation reactions are $MnO_2$, $MoO_3$, $MCr_2O_4$ or $MWO_4$, wherein M stands for any metal forming mixed metal oxides of the given compositions.

The step of forming the catalytically-active oxide film may comprise forming at least one metal oxide having strongly bonded lattice oxygen atoms (typically showing a low propensity for being reduced in a $H_2$ atmosphere), wherein said metal oxide is suitable for catalysing, e.g., dehydrogenation reactions such as the dehydrogenation of isopentane forming isoprene, butane forming butadiene or ethylbenzene forming styrene. Examples of suitable (mixed) metal oxides are $Cr_2O_3$, $AlFeO_3$, $AlCrO_3$ or $ZnO$.

The step of forming the oxide film may also comprise forming spinel structures $MAl_2O_4$ (such as nickel aluminate $NiAl_2O_4$ or hercynite $FeAl_2O_4$), wherein M stands for any metal forming mixed metal oxides of the given composition. Such spinel structures support oxygen adsorption and are suitable for catalysing, e.g., oxidation reactions of organic compounds.

Catalytically coated metallic foam structures exhibit weak interactions between metal foam carrier and coating, namely weak Van-der-Waals and mechanical interactions. By contrast, within the present invention a structurally connected and chemically bonded gradual composition of metals in the center of the foam struts (core) and chemically bonded metal oxides as an outer layer on the surface of the foam struts may form. This ensures a mechanically stable and strong composite foam material, with continuously chemically bonded structure within and/or between metallic and metal oxidic structures, whereby the metallic structure (crystalline, microcrystalline and/or amorphous) gradually segues into a metal oxidic structure (crystalline, microcrystalline and/or amorphous). The oxidic structure may thereby vary in its stochiometrical composition including the formation of islands, areas and/or closed layers of stochiometrically distinct chemical compositions.

In case of aluminum containing alloy compositions, within the subsequent controlled oxidation an alumina layer may be formed, leading to a structural connection of gradual composition from foam metal via spinel to alumina.

Before the step of forming a structural connection between each of at least a subset of the particles and the body is carried out, a passivation layer or film may be formed on the particles and preferably on both the particles and the body. The formation of such a passivation film may be effected by means of a basic (pre-)treatment of the surfaces of the particles and/or the body using, for instance, a basic aqueous solution. The passivation film may help maintain the particle structure during subsequent processing, thereby facilitating a high surface roughness, a large surface area and a high surface porosity on the mesoscopic level. The formation of the passivation film may include the formation of an oxide film acting as a diffusion barrier for solid state diffusion, reducing the sinter activity of the particles and inhibiting metal corrosion. The nature of the passivation film may be controlled by the choice of the base/mixtures of bases and their concentration, the duration as well as the temperature of the treatment and electrochemical methods.

The method may further comprise the step of applying a basic solution having a pH above seven, preferably above eight, to the body before the step of distributing the particles on the surface of the body. Alternatively or in addition, the step of distributing the particles on the surface of the body may comprise the step of dispersing the particles in a basic solution having a pH above seven, preferably above eight, and subsequently applying the basic solution comprising the particles to the body. The basic solution may be an inorganic or an organic solution, wherein the latter has the advantage of being cleanly removable by decomposition in a subsequent thermal treatment step.

Many metals, such as Ni, Co, Cu, Zn, Zr, Mn, Ti, V, Fe or Cr, form an oxide film in basic (pH>7) aqueous solutions which may then act as the passivation film mentioned above inhibiting oxygen diffusion and metal corrosion as well as helping to maintain the original particle structure during subsequent steps. The pH of the basic solution is preferably regulated by adding a basic component and specifically an aqueous solution of ammonium or alkali metal hydroxides. The latter should only be considered, though, if the presence of ammonium or alkali metals does not affect catalytic properties of the final product. Preferably, the bases/basic component used are cleanly removable in a subsequent thermal treatment step. This can be achieved by application of bases such as ammonia and ammonium hydroxide or organic bases free from metallic components such as pyrrolidine or ethylenimine.

The pH of the basic solution may be above the pH at which the isoelectric point of a metal oxide comprising the first metal or alloy and/or the second metal or alloy occurs. Given that the oxide film formed according to the present invention may comprise different (mixed) metal oxides, the pH of the basic solution is preferably chosen such that it is above the pH at which the isoelectric point of the (mixed) metal oxide having the highest isoelectric point occurs.

The pH of the basic solution may be above the pH at which the isoelectric point of the metal/metal oxide in question occurs to allow deprotonation/formation of surface hydroxide/oxide species. Examples are given in the table below:

| Material | Specification or composition | IEP |
| --- | --- | --- |
| Nickel | — | 3.5-4.0 |
| Iron | — | 6.5-6.8 |
| Chromium | — | 6.2-8.1 |
| Dural | Al 95%, Cu 4%, Mg 0.5%, Mn 0.5% | 9.1 |
| 304 SS # 1 | Fe 66.2%, Cr 20%, Ni 12%, Mn 1.8% | 3.4 |
| 304 SS # 2 | Fe 66-72%, Cr 17-20%, Ni 9-12%, Mn 2% | 3.0 |
| 316L SS | Fe 64.5-69.5%, Cr 16-18%, Ni 10.5-13%, Mo 2-2.5%, Mn 2% | 2.8 |
| Zircaloy-4 | Zr 98.2%, Sn 1.5%, Fe 0.2%, Cr 0.1% | 2.4 |
| Inconel 690 | Ni 58-66%, Cr 27-31%, Fe 7-11% | 2.4 |

The basic aqueous solution may comprise a polar molecule showing a strong interaction in aqueous media with metal or metal oxide surfaces providing charged ions. The interaction between the polar molecules and the surfaces of the body as well as the particles results in an enhanced adhesion of the particles to the surface of the body.

The particles may be distributed on the body by sprinkling a powder comprising the particles on the body and vibrating the same to ensure a uniform and homogeneous distribution of the particles on the surface (both external and internal) of the foam body. Different powders and thus particles (in terms of their composition, size, etc.) may be used, either at the same time or in a sequence of steps/treatments.

The step of forming the passivation film, preferably in the form of an oxide film, on the particles and/or the body may comprise the steps of partially dissolving at least one element, which is contained in the first metal or alloy in the body, in the basic solution and distributing the dissolved element in the basic solution, preferably homogeneously throughout the basic solution. Alternatively or in addition, the step of forming the passivation film on the particles and the body may comprise the steps of partially dissolving at least one element, which is contained in the second metal or alloy in the particles, in the basic solution and distributing the dissolved element in the basic solution, preferably homogeneously throughout the basic solution.

Between the step of forming the passivation film and the step of forming a structural connection between each of at least a subset of the particles and the body, a thermal (pre-)treatment step may be carried out to improve the adherence of the particles to the body while largely retaining the original particle shapes resulting in a high surface roughness, a large specific surface area and a high surface porosity on the mesoscopic level. The maximum temperature is preferably kept below the temperature at which a phase change occurs. Alternatively, the thermal pre-treatment step may also lead to a partial pre-sintering thereby further improving the adherence of the particles to the body and/or one another.

In case a basic aqueous solution is used, the thermal pre-treatment step may be carried out to remove organic/volatile components from the solution. If, in addition, one or several elements contained in the first metal or alloy or in the second metal or alloy has/have been dissolved in the basic aqueous solution, the dissolved element or elements become localised on the surfaces of the particles and the body due to the removal of organic/volatile components from the basic solution.

The thermal pre-treatment can be performed by means of convective drying systems in which the heat is supplied by heated air or an inert gas or direct combustion gases. Alternatively, conductive, inductive or vacuum dryers may be employed. Preferably, this step is effected using radiation, such as infrared or microwave radiation, since no heat transfer medium is required. In addition, the surface layers of the metallic foam body dry quickly when using suitable radiation and the absorption of additional energy near the surface swiftly raises the temperature of the metallic foam body. Most preferably, this step is carried out using an infrared furnace emitting radiation in wavelength regions matching the absorption spectra of applied solvents and other organic substances contained in the basic aqueous solution and/or the metal foam as well as the particles distributed thereupon.

The thermal pre-treatment can be performed at a temperature of above 100° C. and preferably between 160° C. and 220° C.

The step of forming a structural connection between each of at least a subset of the particles and the body may include forming sintering bridges between each of at least the subset of the particles and the body. By treatment of a metal foam with alloy powder and subsequent sintering, a structural and chemical connection can be established between metal foam and alloy powder, forming distinct alloy compositions and intermetallic phases. This process can be effected, for instance, by exposing the body on which the particles have been distributed to elevated temperatures in either an inert (e.g. Ar) or reducing (e.g. $H_2$) atmosphere. In case a passivation film has been formed in one of the preceding steps and a reducing atmosphere is used in this step, the thickness of said film can thus be reduced, preferably to zero. Depending on the exact process parameters, sintering bridges may be formed between essentially all the particles on the surface of the body or a true subset, wherein the sintering bridges may comprise alloys of the metals present in the particles as well as the body, intermetallic phases of those metals or mixed crystals thereof. In the latter case (and again depending on the exact processing conditions), the remaining particles (i.e., those not forming part of the subset) may have essentially merged with the body material during sintering to form a surface layer or shell of sintered material, which may comprise, e.g., alloys, intermetallic phases and/or mixed crystals of the metals involved, on top of an 'unsintered' core, wherein the chemical composition of said core remains substantially unchanged during the step of forming a structural connection between each of at least a subset of the particles and the body. Alternatively, the remaining particles may not be structurally connected to the body at all and may be removed prior to use. The latter particles may act as spacing elements separating surrounding particles and generating a further increase in surface roughness, specific surface area and surface porosity on the mesoscopic level after being removed.

In case the step of forming a structural connection between each of at least a subset of the particles and the body is effected by exposing the body on which the particles have been distributed to elevated temperatures, the (maximum) temperature is chosen such that it remains equal to or below the melting point of the second metal/alloy. Preferably the (maximum) temperature stays below the melting point of the second metal or alloy by at least 5° C., more preferably by at least 10° C., and most preferably by at least 20° C. More generally, the melting point of the first metal/alloy may be higher than the melting point of the second metal/alloy, preferably by at least 5° C., more preferably by at least 10° C., and most preferably by at least 20° C.

The step of forming the (second) oxide film on the particles and the body is most preferably carried out in a separate step subsequent to the step of forming a structural connection between each of at least a subset of the particles and the body. Within this controlled oxidation process, a defined oxide layer can be formed, which is chemically and structurally connected to the underlying metals. Thereby a continuous interface of gradual composition from the metals to the active metal oxide surface layer can be formed. The oxidic structure may thereby vary in its stochiometrical composition including the formation of islands, areas and/or closed layers of stochiometrically distinct chemical compositions.

If the step of forming structural connections is carried out at elevated temperatures, the step of forming the (second) oxide film on the particles (and optionally the body) is most preferably carried out at a lower temperature or a lower average temperature than the (preceding) step of forming structural connections. Preferably, the step of forming an oxide film is carried out at a temperature of between 500° C. and 1300° C. By the same token, the step of forming the (second) oxide film may include forming an oxide film differing from a corresponding native oxide film, e.g., in thickness and/or in its chemical composition. Most preferably, the step of forming the oxide film is carried out in a separate and subsequent step under bespoke processing conditions to gain full control over the chemical and physical properties of the oxide film. As diffusion coefficients and the diffusion behavior of differing metal atoms, their cations and oxygen vary through diverging metallic and oxidic layers and formation of different oxide layers is based on thermodynamically and kinetically influenceable processes, parameters such as layer composition, layer thickness and density as well as catalytic properties of the resulting oxide composition may be controlled by adjusting the oxygen partial pressure and/or the temperature as well as the duration of the oxidation treatment. The stability of metal oxides depends on thermodynamics and increases with decreasing Gibbs free energies of formation. As the free energy of formation is negative for most metal oxides, the formation of all metal oxides by oxidation of any metal present in the semifinished product can occur within oxidizing conditions. Given an alloy of the composition Ni—Fe—Cr—Al, oxidizing it at 700° C., the stability of possibly formed oxides is decreasing in the order $Al2O_3 > Cr_2O_3 > FeO > Fe_3O_4 > NiO > Fe_2O_3$. Additionally, the reduction of oxygen partial pressure can be used to inhibit the formation of distinct oxides having a higher oxygen requirement. At 700° C. the formation of $Al_2O_3$ requires at least $p(O_2) \geq 10^{-42}$ atm, wherein for the formation of $Cr_2O_3$ $p(O_2) \geq 10^{-32}$ atm, $Fe_3O_4$ $p(O_2) \geq 10^{-22}$ atm, NiO $p(O_2) \geq 10^{-18}$ atm and $Fe_2O_3$ $p(O_2) \geq 10^{-12}$ atm are needed. Reducing the oxygen partial pressure by mixing with inert gas or application of vacuum enables the selective formation of several oxides and mixed oxides. The formation and growth of oxide interfaces occurs by integration of oxygen into the metal lattice, including inward diffusion of oxygen anions into the metal lattice and outward diffusion of metal atoms and cations towards the surface. Diffusion takes place through the metal lattice and metal oxide lattices, preferably on rough surfaces providing grain boundaries and lattice defects. The rate of diffusion for a given metal or cation depends on its diffusion coefficient. As diffusion coefficients of differing elements vary, especially the content of slowly diffusing species can be accelerated or limited by adjusting temperature and duration of the oxidative treatment. The oxide film may have a thickness of less than 5 μm, preferably less than 2.5 μm and most preferably between 0.5 μm and 2.0 μm.

The first metal or alloy may be selected from a group comprising Ni, Cr, Cu, Fe, Mn, Al, Ti, Co, W, Mo, Ag, Si, Ta, Nb, Sn, Zn, Bi, B, Zr, Ce, and La (as well as mixtures thereof). Preferably, the first metal or alloy is selected from a group comprising Ni, Cu, Fe, Co, Ag (and mixtures thereof). Preferred examples of the first metal or alloy are Ni, Cu, or Fe (and mixtures thereof).

The second metal or alloy may be selected from a group comprising Ni, Cr, Cu, Fe, Mn, Al, Ti, Co, W, Mo, Ag, Si, Ta, Nb, Sn, Zn, Bi, B, Zr, Ce, and La (as well as mixtures thereof). Preferably, the second metal or alloy is selected from a group comprising Ni, Cr, Fe, Al, Co, Mo, Ag (and mixtures thereof). Preferred examples of the second metal or alloy are NiCrAl, CuMn, Al, FeCrAl, NiFeCrAl, Inconel 600 (Ni≥72%. Cr 14-17%, Fe 6-10%, Co≤1.5%, Mn≤1% Cu≤0.5%, Si≤0.5%, Al≤0.3%, Ti≤0.3%, S0.015%, P≤0.02%, C 0.05-0.1% B≤0.006%), or Inconel 625 (Ni≥58%. Cr 20 23%, Mo 8-10%, Fe≤5%, Nb 3.15-4.15%, Co≤1%, Mn≤0.5%, Cu≤0.5%, Si≤0.5%, Al≤0.4%, Ti≤0.4%, P≤0.02%, S≤0.015%, C 0.03 0.1%).

Preferred combinations of the first metal/alloy and the second metal/alloy are Ni+NiCrAl, Cu+CuMn, Ni+Al, Fe+FeCrAl, Ni+Inconel 600, Ni+Inconel 625, or Ni+NiFeCrAl.

According to a second aspect of the present invention a catalyst material is provided obtainable by a method according to the first aspect.

According to a third aspect of the present invention, a catalyst material is provided comprising: a body having an open-porous foam structure and comprising at least a first metal or alloy; particles comprising at least a second metal or alloy, wherein each of at least a subset of the particles and the body are structurally connected; and an oxide film on at least the subset of the particles and preferably also the body, wherein the oxide film has a catalytically active surface. The oxide film may comprise at least one metal oxide capable of changing its oxidation state. Alternatively or in addition, the oxide film may comprise at least one metal oxide having weakly bonded lattice oxygen atoms. Alternatively or in addition, the oxide film may comprise at least one metal oxide having strongly bonded lattice oxygen atoms. The oxide film may further comprise spinel structures $MAl_2O_4$.

At least a subset of the particles and the body may be structurally connected by means of sintering bridges.

The catalyst material may have a surface roughness of $R_z$>50 μm (DIN EN ISO 4287).

The catalyst material may serve as a carrier for a coating on (at least a portion) of the body's surface on microscopic, mesoscopic and/or macroscopic levels. The macroscopic level (>200 μm) refers to the nature, size and distribution of pores, channels and the surface of the base foam structure. The mesoscopic level (1 nm-200 μm) is generated by open spaces in between the three-dimensional arrangement of particles on the foam surface. The microscopic level (<1 nm) refers to micro- and submicropores within particles and the oxidic surface layer. The catalyst material may serve as a carrier for a porous coating on (at least a portion) of the body's surface, which mechanically and physically protects the underlying catalytically-active film and can be traversed by reactant molecules by pore diffusion. The catalyst material may thus serve as a carrier for a porous coating on (at least a portion) of the body's surface which may be traversed by only a partial amount of reactant and/or product molecules of specific shapes and/or sizes allowing to additionally control the selectivity of the underlying catalytically active film by adding a shape selectivity effect to the catalyst material. Different specific shapes and/or sizes of molecules may occur for example in the case of constitutional isomers of organic molecules. Those may be separated according to their difference in diffusional coefficients in constraints channels by a coating of zeolites. A typical example is the separation of ortho-, meta- and para-xylene by a coating of zeolite type ZSM-5. Here, the para-xylene would preferentially reach the active sites on the surface of the catalyst material and, thus, get converted with a much higher selectivity than ortho- and meta-xylene. In this example, the use of a coating by ZSM-5 would allow for a preferential degradation of para-xylene from a mixed ortho-, meta- and para-xylene feed.

Additionally the catalyst material may serve as a carrier for a coating on (at least a portion of) the oxide film, whereby the coating acts as a catalytically active coating. In this case, the underlying (second) oxide film could act as a reservoir supplying catalytically active metals/ions to the coating. The coating may be applied by wet impregnation, dry impregnation, precipitation or as washcoat.

The oxide film may have a thickness of less than 5 μm, preferably less than 2.5 μm and most preferably between 0.5 μm and 2.0 μm.

The catalyst material may have an area density of between 150 and 10,000 g/m² (based on gravimetric or non-destructive instrumental physical analysis according to ISO 10111). The catalyst material may have a foam density of 0.036 to 5.26 g/cm³ (gravimetric, ISO 2738). The catalyst material may have porosity of between 80 and 98% as determined according to, e.g., the Visiocell analysis method described in "The Guide 2000 of Technical Foams", Book 4, Part 4, pages 33-41.

The first metal or alloy may be selected from a group comprising Ni, Cr, Cu, Fe, Mn, Al, Ti, Co, W, Mo, Ag, Si, Ta, Nb, Sn, Zn, Bi, B, Zr, Ce, and La (as well as mixtures thereof). Preferably, the first metal or alloy is selected from a group comprising Ni, Cu, Fe, Co, Ag (and mixtures thereof). Preferred examples of the first metal or alloy are Ni, Cu, or Fe (and mixtures thereof).

The second metal or alloy may be selected from a group comprising Ni, Cr, Cu, Fe, Mn, Al, Ti, Co, W, Mo, Ag, Si, Ta, Nb, Sn, Zn, Bi, B, Zr, Ce, and La (as well as mixtures thereof). Preferably, the second metal or alloy is selected from a group comprising Ni, Cr, Fe, Al, Co, Mo, Ag (and mixtures thereof). Preferred examples of the second metal or alloy are NiCrAl, CuMn, Al, FeCrAl, NiFeCrAl, Inconel 600 (Ni≥72%. Cr 14-17%, Fe 6-10%, Co≤1.5%, Mn≤1%, Cu≤0.5%, Si≤0.5%, Al≤03%, Ti≤0.3%, S≤0.015%, P≤0.02%, C 0.05-0.1%, B≤0.006%), or Inconel 625 (Ni≥58%. Cr 20 23%, Mo 8-10%, Fe≤5%, Nb 3.15-4.15%, Co≤1%, Mn≤0.5%, Cu≤. %, Si≤0.5%, Al≤0.4%, Ti≤0.4%, P≤0.02%, S≤0.015%, C 0.03 0.1%).

Preferred combinations of the first metal/alloy and the second metal/alloy are Ni+NiCrAl, Cu+CuMn, Ni+Al, Fe+FeCrAl, Ni+Inconel 600, Ni+Inconel 625, or Ni+NiFeCrAl.

A fourth aspect of the present invention relates to the use of the catalyst material according to the second aspect, the catalyst material according to the third aspect, or the catalyst material which is produced directly by a process according to the first aspect for catalysing hydrogenation reactions at elevated temperatures.

A fifth aspect of the present invention relates to the use of the catalyst material according to the second aspect, the catalyst material according to the third aspect, or the catalyst material which is produced directly by a process according to the first aspect for catalysing the partial oxidation of organic compounds.

A sixth aspect of the present invention relates to the use of the catalyst material according to the second aspect, the catalyst material according to the third aspect, or the catalyst material which is produced directly by a process according to the first aspect for catalysing dehydrogenation reactions such as the dehydrogenation of isopentane forming isoprene, butane forming butadiene or ethylbenzene forming styrene.

A seventh aspect of the present invention relates to the use of the catalyst material according to the second aspect, the catalyst material according to the third aspect, or the catalyst material which is produced directly by a process according to the first aspect as a carrier for a coating on (at least a portion of) the oxide film.

DETAILED DESCRIPTION

The following description is presented to enable a person skilled in the art to make and use the invention, and is provided in the context of a particular application. Various modifications to the disclosed embodiments will be readily apparent to those skilled in the art. The general principles defined herein may be applied to other embodiments and applications without departing from the scope of the present invention. Thus, the present invention is not intended to be limited to the embodiments shown, but is to be accorded the widest scope consistent with the principles and features disclosed herein.

According to a first embodiment, an open-porous nickel foam body having an average cell size of 450 μm, a porosity of approximately 90%, a thickness of 1.6 mm, a width of 150 mm, and a length of 300 mm is provided, wherein the nickel was deposited on a PU foam by means of electroplating and the PU was subsequently burnt off. The particles are provided as a powder weighing 18 g in total and comprising Ni—Cr—Al particles (Ni 62.3%, Cr 15.4%, Al 22.3%) of less than 73 μm in diameter. The basic solution comprises a volume of 50 ml of 2 mM ammonium hydroxide.

The Ni foam body is sprayed with the basic solution from both sides leading to a homogeneous distribution of the basic solution within the porous network of the foam, wherein only the surfaces of the struts are coated with basic solution. Subsequently, the foam is arranged in a vibration apparatus and completely covered in the particle powder. Due to the effect of the vibrations, the powder is distributed uniformly on the surface of the body, wherein the open-porous character of the foam is largely maintained. Both the surface of the foam body as well as the particles are completely covered in the basic solution. Due to the basic pre-treatment, the Ni and Cr parts form surface oxides and hydroxides enhancing the interaction with the polar molecules in the solution and the adhesion of the particles to the surface of the foam body. The (hydr-)oxide films have a passivation effect and reduce the sinter activity of the particles as well as serve to maintain the particle structure during drying and a thermal treatment to remove organic and volatile compounds until the subsequent sintering. Part of the Al present in the particles may, due to the basic environment, become dissolved forming molecular aluminate species and distributed uniformly in the basic solution by means of diffusion and thus on the surface of the body. The uniformly distributed charged species strongly interact with surface (hydr-)oxide films of the particles and the foam, thereby improving the adhesion of particles to the surface of the body until sintering is carried out.

The thus treated body is then dried at 160-220° C. in an infrared oven during which the particle structure is maintained and conserved due to the passivating hydroxide film.

A further heat treatment is then effected in an Ar atmosphere at 400-600° C. and at a dwell time of 30-90 min as well as a heating rate of 5 K/min. Any remaining volatile/organic constituents are thereby completely removed. Also in this step, the passivation film of the particles ensures the conservation of the particle structure. The sintering process subsequently takes place in the temperature range of 800-1250° C. at a dwell time of 30-90 min in a reducing environment ($H_2$/Ar). During sintering the passivating (hydr-)oxide film on the particles is reduced and metal atoms diffuse into the contact area of particles and struts of the foam body so that the particles form structural connections via cohesive bonds in the form of sintering bridges with the surface of the body. The shape and morphology of the particles is largely maintained resulting in a high surface roughness and a large specific surface area.

Final oxidation is subsequently carried out in a separate step by heating the green body to a temperature of between 800 and 1000° C. under air for 30 to 120 min. Initially (≤30 min), the thermodynamically favoured α aluminium oxide is predominantly formed on the surface of the substrate. Due to the extended duration, Ni ions increasingly diffuse into the oxide film to form nickel aluminate spinel structures as well as nickel oxide. By contrast, Cr ions have a lower coefficient of diffusion leading to Cr rich oxide layers in the lower parts of the oxide film.

The continuous oxide film comprises NiO, $Ni_2Al_2O_4$, $\alpha$-$Al_2O_3$ und $Cr_2O_3$. The surface of the thus-treated body has a high roughness, due to the largely maintained morphology of the particles, and contains a high degree of nickel (nickel oxide, nickel aluminate spinel) due to the migration of nickel into the oxide film. The final oxide has a thickness of 0.5-2.0 μm. The Ni rich material is suitable for use as a catalyst for the hydration of organic oxo-compounds, such as tertiary alcohols, under suitable conditions (240-260° C., 80-100 atm hydrogen pressure) due to its large specific surface area and advantageous transport properties.

According to a second embodiment, an open-porous Cu foam body having an average cell size of 450 μm, a thickness of 1.6 mm, a width of 80 mm, a length of 200 mm and a weight of 2.9 g is provided, wherein the copper was deposited on a PU foam by means of electroplating and the PU was subsequently burnt off. The particles are provided as a powder weighing 2.9 g in total and comprising Cu—Mn particles (Cu 40.0%, Mn 60.0%) of less than 100 μm in diameter. The aqueous basic solution comprises a volume of 50 ml of 2 mM NaOAc.

Before applying it to the foam body itself, the powder is suspended in the basic solution and stored for 16-48 hours at 25 to 80° C. The metal powder particles are thereby covered in a passivating hydroxide layer reducing the sintering activity of the particles and ensuring that the shape of the particles is largely maintained in subsequent treatment steps until sintering is carried out.

Before application the particles are resuspended in the basic solution. The metallic foam body is sprayed with the thus prepared powder suspension in a wet spray coating process several times on both sides. The suspension is sprayed by means of a spraying device resulting in a uniform distribution on the surfaces of the struts of the porous reticulated article. The struts are fully covered by the powder slurry, but the open-porous character of the foam will essentially be maintained.

The thus coated substrate is then dried at 160-220° C. using infrared radiation. The particle structure is maintained due to the passivation and no pre-sintering takes place.

The removal of the organic or volatile compounds is carried out under an Ar atmosphere at 400-600° C. for 30-90 min, wherein the particle structure is completely maintained. The heating rate of the oven is 5 K/min. Subsequently, the foam structure is reduced and sintered in a $H_2$-rich atmosphere in a temperature range of 850-1100° C. Following the reduction of the passivating oxide layer, the particles are structurally connected by means of cohesive bonds in the form of sintering bridges with the surface of the body as well as one another. The particle structure is predominantly preserved during this step. The metallic product has a high specific surface area and roughness.

In a third embodiment, an open-porous Ni foam body having an average cell size of 580 μm, a porosity of approximately 93%, a thickness of 1.9 mm, a width of 200 mm and a length of 200 mm is provided, wherein the nickel was deposited on a PU foam by means of electroplating and the PU was subsequently burnt off. The particles are provided as a powder weighing 15 g in total and comprising Ni—Cr—Al particles (Ni 62.3%, Cr 15.4%, Al 22.3%) of less than 73 μm in diameter. The aqueous basic solution comprises a volume of 50 ml of 2 mM ammonium hydroxide.

The Ni foam body is sprayed with the basic solution on both sides, wherein only the surfaces of the struts are coated with basic solution. Subsequently, the foam is arranged in a vibration apparatus and completely covered in the particle powder. Due to the effect of the vibrations, the powder is distributed uniformly on the surface of the body, wherein the open-porous character of the foam is largely maintained. Both the surface of the foam body as well as the particles are completely covered in the basic solution. The open porosity is maintained. Due to the basic pre-treatment, the Ni and Cr parts form surface (hydr-)oxides enhancing the interaction with the polar molecules in the solution and the adhesion of the particles to the surface of the foam body. The (hydr-) oxide films have a passivation effect and reduce the sinter activity of the particles as well as serve to maintain the particle structure during drying/removal of remaining volatile/organic components until the subsequent sintering. Part of the Al present in the particles may, due to the basic environment, become dissolved forming molecular aluminate species and distributed uniformly in the basic solution by means of diffusion and thus on the surface of the body.

The 'wet' substrate is then left to dry for 24-72 hours at room temperature under air. The particle suspension sinks into the foam structure, whereby particle agglomerates form and the powder load is inhomogeneously distributed from the top side to the bottom side of the foam body.

A further heat treatment is effected under Ar atmosphere at 400-600° C. for 30-90 min and at a heating rate of 5 K/min. The volatile, polar molecules as well as organic constituents previously contained in the aqueous solution and remaining on the surface after the initial drying step are thus completely removed. The particle structure remains intact due to the passivation film. Sintering takes places in the temperature range of 800-1250° C. for 30-90 min under reducing conditions ($H_2$/Ar). During sintering the passivating film of the particles is reduced and metal atoms are allowed to diffuse into the contact area of particles and struts. Connections are formed between the particles as well as the particles and the body by means of cohesive bonds in the form of sintering bridges. The morphology of the particles is predominantly maintained.

The final oxidation step is carried out at a temperature of 900-1200° C. under an $O_2$/Ar atmosphere including between 1.5 and 3% oxygen for 10-60 min. Due to the reduced partial pressure of oxygen and the short dwell time, a thin oxide film is forming, predominantly consisting of thermodynamically favoured aluminium oxide (corundum). In lower layers small amounts of aluminium, nickel and mixed oxides containing chromium as well as $Cr_2O_3$ are to be found.

According to a fourth embodiment, an open-porous Ni foam body having an average cell size of 1,200 μm, a porosity of approximately 95%, a thickness of 3 mm, a width of 300 mm and a length of 500 mm is provided, wherein the nickel was deposited on a PU foam by means of electroplating and the PU was subsequently burnt off. The particles are provided as a powder weighing 130 g in total and comprising 'aged' Al particles with an existing oxide layer, wherein the diameter of the particles is less than 72 μm. The aqueous basic solution comprises a volume of 75 ml of 1 mM NaOH.

The Al particles are arranged in a filter and washed in diluted caustic soda in order to reduce the thickness of the passivating oxide layer or to remove it completely. Subsequently, the particles are washed in double-distilled water and dried.

The coating of the Ni foam body is carried out by means of electrostatic spraying. The dried powder is applied to the charged body as an aerosol using a nozzle. The nozzle comprises high voltage electrodes which provide the powder particles in the aerosol with charge. In this way an electric field is generated causing the charged particles to move towards the surface of the oppositely charged Ni foam body and remain attached thereto.

The thus coated body is then sintered under an $H_2$/Ar atmosphere at a temperature of approximately 650° C. for about 60 min. The aluminium particles (after having being stripped of their passivation layer) form structural connections with the surface of the body in the form of sintering bridges.

The final oxidation step is carried out at a temperature of 450-900° C. under an $O_2$/Ar atmosphere including between 1.5 and 3% oxygen for 10-60 min. Due to the reduced partial pressure of oxygen and the short dwell time, a thin oxide film is forming, predominantly consisting of thermodynamically favoured $\alpha$-$Al_2O_3$.

According to a fifth embodiment, an open-porous Fe foam body having an average cell size of 450 μm, a porosity of approximately 90%, a thickness of 1.6 mm, a width of 150 mm and a length of 300 mm is provided, wherein the iron was deposited on a PU foam by means of electroplating and the PU was subsequently burnt off. The particles are provided as a powder weighing 35 g in total and comprising Fe—Cr—Al particles (Fe 55.0%, Cr 35.0%, Al 10.0%) of less than 73 μm in diameter. The aqueous basic solution comprises a volume of 50 ml of 2 mM ammonium hydroxide.

The Fe foam body is sprayed with the basic solution on both sides leading to a uniform distribution of the basic solution in the porous network of the foam, wherein only the surfaces of the struts are coated with basic solution. Subsequently, the foam is arranged in a vibration apparatus and completely covered in the particle powder. Due to the effect of the vibrations, the powder is distributed uniformly on the surface of the body, wherein the open-porous character of the foam is largely maintained. Both the surface of the foam body as well as the particles are completely coated in the basic solution. The open porosity is maintained. Due to the basic pre-treatment, the Fe and Cr parts form surface (hydr-)oxides enhancing the interaction with the polar molecules and the adhesion of the particles to the surface of the foam body. The (hydr-)oxide films have a passivation effect and reduce the sinter activity of the particles as well as serve to maintain the particle structure during drying until the subsequent sintering thereby facilitating a high surface roughness in the final product. Part of the Al initially present in the particles may, due to the basic environment, become dissolved forming molecular aluminate species and distributed uniformly in the basic solution by means of diffusion and thus, after drying, on the surface of the body.

The thus coated substrate is then dried at 160-220° C. using infrared radiation. The particle structure is maintained due to the passivation and no pre-sintering takes place.

A further heat treatment is effected under Ar atmosphere at 400-600° C. for 30-90 min and at a heating rate of 5 K/min. The volatile, polar molecules as well as organic constituents are thus completely removed. The particle structure remains intact due to the passivation film. Sintering takes places in the temperature range of 800-1250° C. for 30-90 min under reducing conditions ($H_2$/Ar). During sintering the passivating film of the particles is reduced and metal atoms are allowed to diffuse into the contact area of particles and struts. Connections are formed between the particles as well as the particles and the body by means of cohesive bonds in the form of sintering bridges. The morphology of the particles is predominantly maintained.

Final oxidation is subsequently carried out in a separate step by heating the thus-treated body to a temperature of between 800 and 1000° C. under air for 20 to 60 min. Initially (≤15 min), α aluminium oxide is predominantly formed on the surface of the substrate. After this initial period, Fe ions increasingly diffuse into the oxide film to form iron aluminate spinel structures as well as $AlFeO_3$, thereby dominating and defining the properties of the catalytically-active surface layer.

The uppermost oxide layer thus predominantly comprises $AlFeO_3$ besides $Fe_2Al_2O_4$. Somewhat deeper lie layers comprising $Al_{1.98}Cr_{0.02}O_3$ und $Al_2O_3$. The surface of the thus-treated body therefore has a high roughness of $R_z$=100-300 μm, due to the largely maintained morphology of the particles, and contains a high degree of iron due to the migration of nickel into the oxide film. The final oxide has a thickness of approximately 0.5 μm. Due to its large specific surface area as well as advantageous transport properties, the thus produced catalytic foam materials are highly suitable for the catalytic activation of hydrogen peroxide in conjunction with the formation of reactive oxygen species for the oxidation of organic components, for catalytic hydrations, as a catalyst for the synthesis of ammonia or as a Fischer-Tropsch catalyst.

According to the sixth embodiment, an open-porous Ni foam body having an average cell size of 800 μm, a porosity of approximately 93%, a thickness of 2.5 mm, a width of 400 mm and a length of 1500 mm is provided, wherein the iron was deposited on a PU foam by means of electroplating and the PU was subsequently burnt off. The particles are provided as a powder weighing 430 g in total and comprising Ni—Fe—Cr—Al particles (Ni 19.7%, Fe 36.3%, Cr 34.2%, Al 9.8%) of less than 73 μm in diameter. The aqueous basic solution comprises a volume of 150 ml of 2% aqueous solution of polyethyleneimine.

The Ni foam body is sprayed with the basic solution on both sides leading to a uniform distribution of the basic solution in the porous network of the foam, wherein only the surfaces of the struts are coated with basic solution. Subsequently, the foam is arranged in a vibration apparatus and completely covered in the particle powder. Due to the effect of the vibrations, the powder is distributed uniformly on the surface of the body, wherein the open-porous character of the foam is largely maintained. Both the surfaces of the foam body as well as the particles are completely coated in the basic solution. The open porosity is maintained. Due to the basic pre-treatment, the Ni, Fe and Cr parts form surface (hydr-)oxides enhancing the interaction with the polar molecules in the aqueous solution and the adhesion of the particles to the surface of the foam body. The (hydr-)oxide films have a passivation effect and reduce the sinter activity of the particles as well as serve to maintain the particle structure during drying until the subsequent sintering thereby facilitating a high surface roughness in the final product. Part of the Al initially present in the particles may, due to the basic environment, become dissolved forming molecular aluminate species and distributed uniformly in the basic solution by means of diffusion and thus, after drying, on the surface of the body.

The thus coated substrate is then dried at 160-220° C. using infrared radiation. The particle structure is maintained due to the passivation and no pre-sintering takes place.

A further heat treatment is effected under Ar atmosphere at 400-600° C. for 30-90 min and at a heating rate of 5 K/min. The volatile, polar molecules as well as organic constituents are thus completely removed. The particle structure remains intact due to the passivation film. Sintering takes places in the temperature range of 800-1250° C. for 30-90 min under reducing conditions ($H_2$/Ar). During sintering the passivating film of the particles is reduced and metal atoms are allowed to diffuse into the contact area of particles and struts. Connections are formed between the particles as well as the particles and the body by means of cohesive bonds in the form of sintering bridges. The morphology of the particles is predominantly maintained and a surface having a high roughness and a large specific surface area is formed.

Final oxidation is subsequently carried out in a separate step by heating the thus-treated body to a temperature of between 900 and 1200° C. under air for 3 to 60 min. Initially (≤15 min), a thermodynamically favoured α aluminium oxide is predominantly formed on the surface of the substrate. The higher the chosen temperature, the more dense the a aluminium oxide layer and the slower the diffusion of foreign ions into the layer become. After this initial period, Ni and Fe ions—at low to medium temperatures—tend to increasingly migrate into the oxide film to form Fe and Ni aluminate spinel structures, respectively, as well as $AlFeO_3$ and Ni oxides. Since the diffusion coefficient of Fe(II) ions through the oxide layer is higher than the one of Ni(II) ions, the Fe content is higher than the Ni content at the surface.

Accordingly, the continuous oxide layer predominantly comprises AlFeO$_3$NiO, α-Al$_2$O$_3$ in addition to Fe and Ni aluminate spinel structures. Lower layers predominantly comprise Cr$_2$O$_3$ The surface of the thus-treated body therefore has a high roughness (R$_Z$=144.92 µm), due to the largely maintained morphology of the particles, and has a high content of the catalytically active metals iron and nickel. The final oxide has a thickness of 0.5 to 2.0 µm. Due to its large specific surface area as well as advantageous transport properties, the thus produced catalytic foam materials are highly suitable for the heterogeneous catalysis.

What is claimed is:

1. A method of manufacturing a catalyst material, comprising the steps of:
   providing a body having an open-porous foam structure and comprising at least a first metal or alloy;
   providing particles, each of which particles comprising at least a second metal or alloy;
   distributing the particles on the body;
   forming a passivation film on the particles;
   forming a structural connection between each of at least a subset of the particles and the body; and
   forming an oxide film on at least the subset of the particles, wherein the oxide film has a catalytically active surface,
   wherein the step of forming a structural connection between each of at least a subset of the particles and the body includes forming sintering bridges between each of at least the subset of the particles and the body in an inert or reducing atmosphere, wherein the sintering bridges may comprise alloys of the metals present in the particles as well as the body, intermetallic phases of those metals or mixed crystals thereof, and wherein the step of forming the passivation film on the particles precedes the step of forming the structural connection between each of at least a subset of the particles and the body.

2. The method according to claim 1, wherein the step of forming the oxide film comprises forming the oxide film on at least the subset of the particles and the body.

3. The method according to claim 1, wherein the step of forming the oxide film comprises forming at least one metal oxide capable of changing its oxidation state, wherein the said metal oxide is suitable for catalysing hydrogenation reactions, forming at least one metal oxide having weakly bonded lattice oxygen atoms, wherein said metal oxide is suitable for catalysing the partial oxidation of organic compounds, forming at least one metal oxide having strongly bonded lattice oxygen atoms, wherein said metal oxide is suitable for catalysing dehydrogenation reactions, and/or forming spinel structures MAl$_2$O$_4$ suitable for improving oxygen adsorption and catalysing oxidation reactions of organic compounds.

4. The method according to claim 1, further comprising the step of applying a basic solution having a pH above seven to the body before the step of distributing the particles on the surface of the body.

5. The method according to claim 1, wherein the step of distributing the particles on the surface of the body comprises the step of dispersing the particles in a basic solution having a pH above seven and subsequently applying the basic solution comprising the particles to the body.

6. The method according to claim 4, wherein the pH of the basic solution is above the pH at which the isoelectric point of a metal oxide comprising the first metal or alloy and/or the second metal or alloy occurs.

7. The method according to claim 4, further comprising the steps of partially dissolving at least one element contained in the first metal or alloy in the body in the basic solution and distributing the dissolved element in the basic solution and/or comprising the steps of partially dissolving at least one element contained in the second metal or alloy in the particles in the basic solution and distributing the dissolved element in the basic solution.

8. The method according to claim 1, wherein, between the step of forming the passivation film on the particles and the step of forming a structural connection between each of at least a subset of the particles and the body, a thermal pre-treatment step is carried out-prefer-aby using infrared radiation.

9. The method according to claim 1, wherein the step of forming the oxide film on the surfaces of the particles and the body is carried out in a separate step subsequent to the step of forming a structural connection between each of at least a subset of the particles and the body.

10. A catalyst material, manufactured according to the method of claim 1, comprising a body having an open-porous foam structure and comprising at least a first metal or alloy; particles comprising at least a second metal or alloy, wherein a passivation film is formed on the particles, subsequent to the passivation film being formed on the particles each of at least a subset of the particles and the body are structurally connected, wherein at least a subset of the particles and the body are structurally connected by means of sintering bridges, and the sintering bridges may comprise alloys of the metals present in the particles as well as the body, intermetallic phases of those metals or mixed crystals thereof; and an oxide film formed on at least the subset of the particles, wherein the oxide film has a catalytically active surface.

11. The catalyst material according to claim 10, wherein the oxide film is formed on at least the subset of the particles and the body.

12. The catalyst material according to claim 10, wherein the oxide film comprises at least one metal oxide capable of changing its oxidation state, at least one metal oxide having weakly bonded lattice oxygen atoms, at least one metal oxide having strongly bonded lattice oxygen atoms, and/or spinel structures MAl$_2$O$_4$.

13. The catalyst material according to claim 10, wherein the material has a surface roughness of R$_Z$>50 µm.

* * * * *